Patented May 22, 1928.

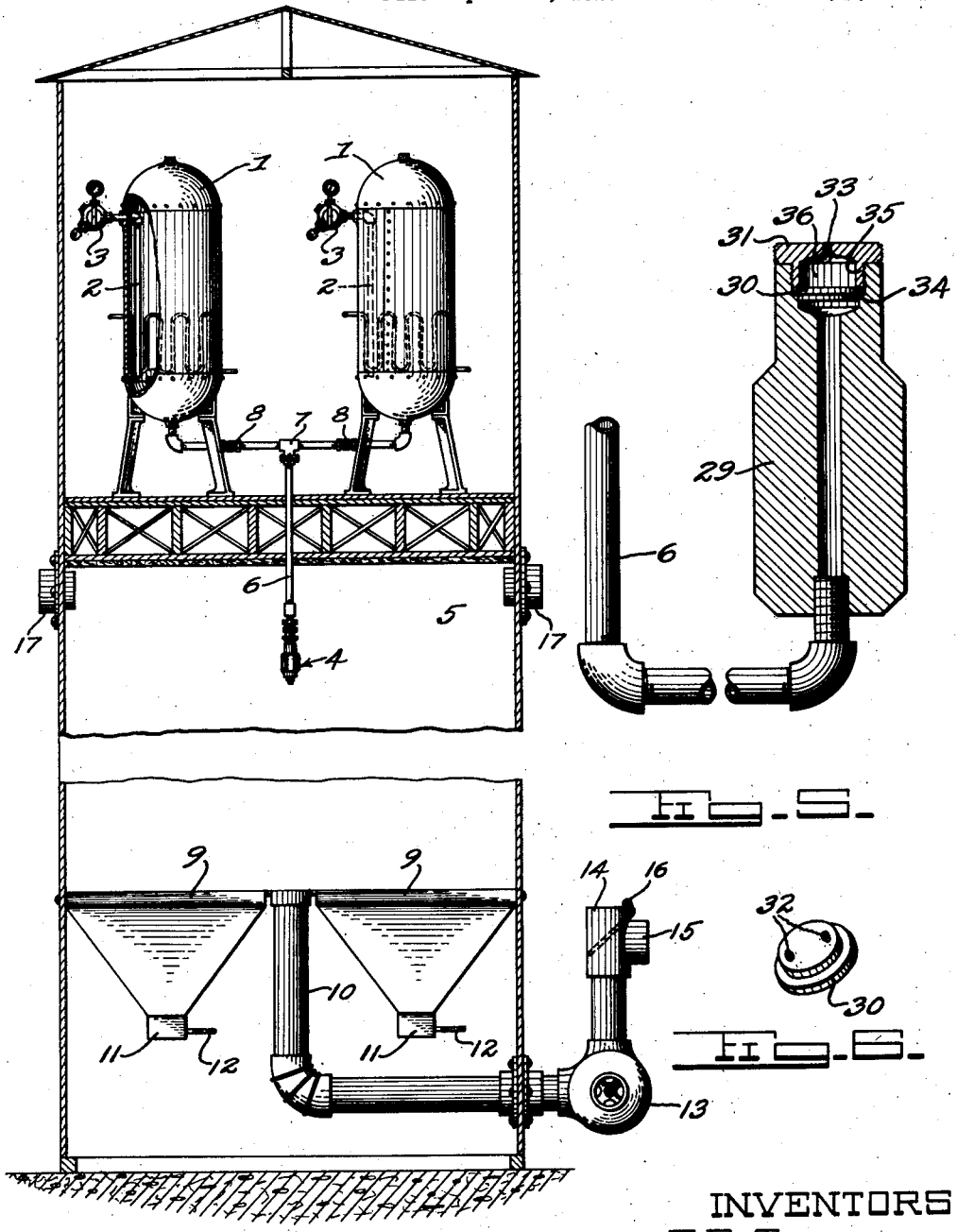

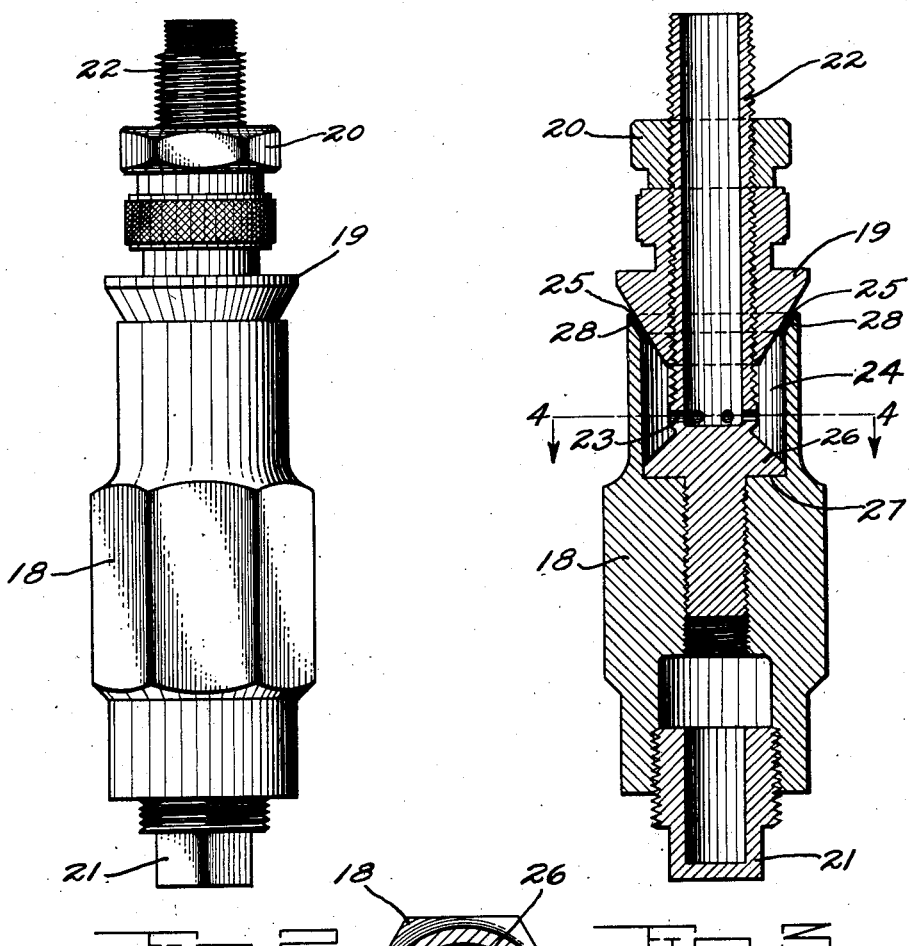

1,670,831

UNITED STATES PATENT OFFICE.

THOMAS B. TURLEY, WILLIAM H. ROSS, AND ALBERT R. MERZ, OF WASHINGTON, DISTRICT OF COLUMBIA, ASSIGNORS TO THE GOVERNMENT AND THE PEOPLE OF THE UNITED STATES OF AMERICA.

SPRAYING DEVICE.

Application filed April 13, 1927. Serial No. 183,523.

(GRANTED UNDER THE PROVISIONS OF THE ACT OF MARCH 3, 1883, 22 STAT. L., 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to us of any royalty thereon.

Commercial fertilizers as now manufactured consist of mixtures of inorganic salts and of various organic wastes such as cotton seed meal, tankage and fish scrap. These organic materials are admirably suited for use in fertilizers in that they not only serve as important sources of plant food but they also greatly improve the physical condition of the mixture in which they are included. The supply of these materials is not sufficient, however, to meet the demand and the proportion in which they now occur in fertilizers is estimated to be only about half as great as a few years ago. With a view to supplying this deficiency in nitrogenous materials a great deal of attention is now being given to the synthesis of such nitrogen compounds as calcium nitrate, urea and ammonium nitrate.

From a chemical point of view, these materials are particularly well adapted for use as fertilizers. They together contain the three forms of nitrogen—ammonia, nitrate and organic—which are considered desirable in all mixed fertilizers; they leave no accumulation of toxic residues in the soil; and all contain nitrogen in a readily available form.

It unfortunately happens, however, that these salts are all hygroscopic and readily absorb moisture from the air at humidities which commonly prevail in humid countries. This property greatly interferes with their use in fertilizers in that it causes the mixture in which they are included to become sticky and cake. The principal cause of caking in salts of this kind is due to a knitting together of the crystals by the successive absorption and loss of moisture when the humidity of the air alternately rises above and then falls below that corresponding to the vapor pressure of their saturated solutions. The rate at which setting occurs will necessarily vary greatly with the mechanical condition of the material and will be most pronounced in products which are finely ground. In this condition the points of contact between the individual particles are at a maximum, the surface area of the material is relatively large, the force of adhesion acting between the very fine particles is considerable, and a secondary knitting occurs through the growth of the larger crystals at the expense of the smaller crystals. This exchange of crystal growth is due to the difference in solubility of crystal particles which differ in size as necessarily occurs in all materials that have been pulverized by grinding.

We have found that the physical condition of a fertilizer material may be greatly improved when it is prepared in the form of spherical balls or grains of uniform size. In this condition the surface area of the material is greatly reduced, the points of contact between the individual particles are at a minimum, the force of adhesion no longer plays an effective rôle and secondary caking which depends on wide variations in the size of the particles is entirely prevented.

The granulation of a fertilizer material in the form of spherical balls or grains gives it the further distinctive property of readily flowing through an orifice or through the adjustable openings in a fertilizer drilling or distributing machine.

In the preparation of urea from ammonia and carbon dioxide the liquefied gases are compressed into an autoclave at about 100 atmospheres and 135° C., and the resultant liquid product allowed to discharge through a relief valve at the top of the autoclave into a fractionating column to separate the uncombined ammonia and carbon dioxide from the solution of urea which is formed in the process. The latter is then concentrated in a vacuum evaporator and the molten product finally drawn off through a suitable opening in the bottom. As the urea cools it forms a hard mass which is very difficult to grind, except in very dry weather, owing to its hygroscopic nature.

In the operation of our process the molten product is discharged from the evaporator through a nozzle of special design which divides it into a spray of small droplets under such conditions that the droplets congeal to solid spheres before reaching the bottom of the spraying chamber. The necessity for subsequent crushing or grinding of the urea is thus avoided.

The object of our invention is thus to provide a simple and efficient method for treating a fusible fertilizer material, such as urea, which treatment will at the same time decrease its tendency to cake, increase its drillability and reduce the cost of manufacture.

In the accompanying drawings there is shown one embodiment of an apparatus for carrying out the process of our invention.

Fig. 1 is a vertical sectional view through the spraying chamber and the compartment above the chamber in which the evaporators are shown in elevation with parts broken away.

Fig. 2 is an elevational view of a spraying nozzle which is adapted for use in this process.

Fig. 3 is a vertical cross-sectional view of the nozzle shown in Fig. 2.

Fig. 4 is a horizontal cross-sectional view taken on the line 4—4 of Fig. 3.

Fig. 5 is a vertical sectional view of a modified form of spraying nozzle with parts shown in elevation.

Fig. 6 is a perspective view of the perforated plate used in the nozzle shown in Fig. 5.

Referring to the drawings, 1 represents vacuum evaporators or other containers in which a solution of urea, calcium nitrate or other fusible material is evaporated to such a concentration that its content of water is reduced to 10 per cent or less. Each evaporator is provided with a pipe 2 which reaches almost to the bottoms of the evaporator and connects through a reducing valve 3 on the outside of the evaporator with a supply (not shown) of air under pressure.

The nozzle 4 is centrally supported within the spraying chamber 5 by the steam-jacketed pipe 6 which connects through the flanged T 7 and the valves 8 with the bottom of each evaporator.

The lower portion of the spraying chamber is constructed in the form of a series of hoppers 9 in annular arrangement about the pipe 10. The walls of the hoppers converge downwardly and the lower end of each is provided with a spout 11 and a valve 12 of any suitable design.

Circulation of air through the spraying chamber is secured by means of a fan 13 which continuously withdraws air at ordinary temperature and pressure through the inlet 14, or treated air from a conditioning system, not shown, through the inlet 15, according as the two-way valve 16 is set to receive one or the other, and forces it through the pipe 10, the spraying chamber 5 and the exit openings 17.

The spraying nozzle represented in Figs. 2, 3 and 4 may be constructed of aluminum or other resistant material. This nozzle has the novel feature that the material to be sprayed enters and is discharged from the same end of the nozzle. When it is positioned as represented in Fig. 1, the material to be granulated enters the nozzle by gravity and is discharged upwardly in a conical spray of small droplets about the feed pipe 6. The essential parts of this nozzle comprise a casing 18, an adjustable cone-shaped nut 19, a lock nut 20, a cap 21 and a screw 22 which is hollow for a portion of its length and which serves the double function of inlet for the nozzle and support for the adjustable nut 19. When the parts are assembled as represented in Fig. 3, the flange 26 rests on the ground seat 27 and rigidly supports the screw 22 in a central position within the casing thereby insuring a uniform space 25 between the adjustable nut 19 and its ground seat 28.

The essential features of the spraying nozzle shown in Fig. 5 comprise a thick-walled tube 29, a disk 30 and the nozzle cap 31. Two or more holes 32 (Fig. 6) which extend obliquely through the disk have a combined cross-sectional area equal to or greater than the opening or orifice 33 in the center of the nozzle cap 31. The disk is supported by the ground seat 34 and is tightly clamped in position by the annular projection 35 of the nozzle cap. The projection 35 and the disk 30 form a conically terminated chamber 36 through which the openings 32 communicate with the orifice 33.

In the operation of the process the material to be granulated is concentrated or fused in one of the evaporators while being sprayed from the other. In the process of spraying the reducing valve 3 is adjusted to deliver a predetermined pressure which should be at least equal to the head of solution in the evaporator. The valve 8 at the bottom of the evaporator is then opened and the solution allowed to discharge by gravity flow through the pipe 6 and the nozzle 4. At the beginning of the operation the pressure as measured at the outlet of the evaporator will represent the sum of that due to the head of solution in the evaporator and the air pressure delivered by the reducing valve. As the head of the solution decreases the air pressure correspondingly increases to give a uniform flow of material through the nozzle. In the preferred form of nozzle shown in Figs. 2, 3 and 4, the solution passes in turn through the hollow screw 22, the openings 23, the recess 24 in the casing 18 and the annular outlet 25. The tangential direction of the holes 23 gives the solution a rapidly moving spiral motion in the chamber 24 and causes it to discharge from the nozzle in the form of a conical-shaped swirl of liquid droplets which rise to a height of 5–8 feet before reversing their direction. The droplets are congealed while suspended in the chamber by an upward flow of air and are collected in the hoppers 8 in the form of spherical particles of uniform size.

The size of the particles varies with the pressure on the nozzle, the cross-sectional area of the nozzle orifice and with the density and surface tension of the solution sprayed. The nozzle shown in Figs. 2, 3 and 4 offers the important advantages that (1) it can be readily disassembled for cleaning, (2) the cross-sectional area of the nozzle orifice can be readily adjusted to give a spray of the desired subdivision, (3) its capacity can be easily and quickly changed by making a corresponding adjustment in the pressure on the nozzle and in the area of the nozzle orifice, and (4) the inflow of hot solution into the nozzle at the same end from which it is discharged maintains the orifice at a higher temperature than in nozzles of other design and thus avoids danger of stoppage through freezing of the solution.

The capacity of the nozzle shown in Figs. 5 and 6 may be varied by using a series of caps 31 which have central openings of varying sizes.

If the material to be sprayed is of a hygroscopic nature it is necessary to reduce the relative humidity of the air in the spraying chamber below that corresponding to the vapor pressure of its saturated solution. This can be secured most economically by passing the air through a spray chamber operated in connection with a refrigerating plant to condense out the necessary amount of water. In the case of calcium nitrate, for example, the vapor pressure of its saturated solution corresponds to a relative humidity of 55 per cent at a temperature of 20° C. This means that calcium nitrate will deliquesce when exposed to air having a relative humidity above 55 per cent and it is therefore necessary to reduce the relative humidity of the air in the spraying chamber below this percentage when spraying a material of this kind.

The temperature to which the air must be cooled by the spraying water to give any desired relative humidity at a given temperature may be found by use of a psychrometric chart such as that given by W. H. Carrier in the Trans. Am. Soc. Mech. Engrs. 33, 1005 (1911). This chart shows that if it it desired to reduce the relative humidity of the air to, say, 45 per cent at 20° C., the temperature of the water used in the spray through which the air is passed must be reduced to 7° C. If the relative humidity of the air is already below 45 per cent no treatment is then necessary and ordinary air may then be introduced into the spraying chamber through the inlet 14.

In spraying processes such as those described in U. S. Patents 1,498,717 and 1,584,875 the material to be sprayed is shot out in a horizontal direction and allowed to fall to the bottom of the spraying chamber. The process of our invention offers the important advantage that the sprayed particles leave the nozzle in an upward direction and must therefore reverse their direction before starting to fall. This involves a great saving in the height of tower required in the process, or with a given height of tower greatly prolongs the time that the particles remain suspended in the air. Thus, it may be shown that the time taken for a particle to rise A feet and then B feet is equivalent to a straight fall of $X=A+B+2\sqrt{AB}$ feet. If A=6 feet and B=20 feet, then X=48 feet. This shows that a 20 foot fall in our process, when the particles first rise to a height of 6 feet, is equivalent to a fall of 48 feet when the material is sprayed in a horizontal direction.

While the foregoing description of the process of our invention refers particularly to the granulation of a fused material, it is to be understood that our invention is equally applicable for spraying the solution of a salt for the purpose of dehydrating it. When this is the object of the spraying process, hot instead of cold air should be drawn into the spraying chamber through the inlet 14 and the pressure on the nozzle should be increased in order to reduce the size of the particles and thus insure more rapid dehydration of the sprayed material.

What we claim is:—

In an apparatus for granulating a fused material, a spraying device suspended vertically, including a recessed casing, an inlet and outlet at the same end of said casing, means for adjusting the cross-sectional area of said outlet, and passageways within the casing adapted to reverse the direction of flow of the fused material through the casing, give it a centrifugal motion and cause it to be discharged from the outlet in an upward and outward direction.

THOMAS B. TURLEY.
WILLIAM H. ROSS.
ALBERT R. MERZ.